(12) United States Patent
Son

(10) Patent No.: US 11,798,287 B2
(45) Date of Patent: Oct. 24, 2023

(54) DRIVER ASSISTANCE APPARATUS AND METHOD OF CONTROLLING THE SAME

(71) Applicant: HL KLEMOVE CORP., Incheon (KR)

(72) Inventor: Yeongho Son, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 498 days.

(21) Appl. No.: 17/186,716

(22) Filed: Feb. 26, 2021

(65) Prior Publication Data
US 2021/0279481 A1 Sep. 9, 2021

(30) Foreign Application Priority Data

Mar. 4, 2020 (KR) .................. 10-2020-0027186

(51) Int. Cl.
G06K 9/00 (2022.01)
G06V 20/56 (2022.01)
G01S 19/42 (2010.01)
G08G 1/01 (2006.01)
G06V 10/98 (2022.01)
G06T 7/70 (2017.01)

(52) U.S. Cl.
CPC .............. G06V 20/56 (2022.01); G01S 19/42 (2013.01); G06V 10/98 (2022.01); G08G 1/0112 (2013.01); G08G 1/0116 (2013.01); G06T 7/70 (2017.01)

(58) Field of Classification Search
None
See application file for complete search history.

(56) References Cited

U.S. PATENT DOCUMENTS

| | | | |
|---|---|---|---|
| 2018/0039269 A1* | 2/2018 | Lambermont | G05D 1/0257 |
| 2021/0024063 A1* | 1/2021 | Luo | G06V 20/58 |

* cited by examiner

*Primary Examiner* — Soo Jin Park
(74) *Attorney, Agent, or Firm* — Ladas & Parry, LLP

(57) ABSTRACT

A driver assistance apparatus includes a global positioning system (GPS) module configured to obtain position data of a vehicle; a Light Detection And Ranging (LiDAR) installed in the vehicle to have an external field of view of the vehicle, and configured to obtain first image data for the external field of view of the vehicle; a communication interface configured to receive second image data obtained by an external LiDAR disposed at a position different from the vehicle; and a controller including at least one processor configured to process the first image data and the second image data. The controller may be configured to compare the first image data and the second image data, and to correct the position data when an error occurs as a result of the comparison.

20 Claims, 10 Drawing Sheets

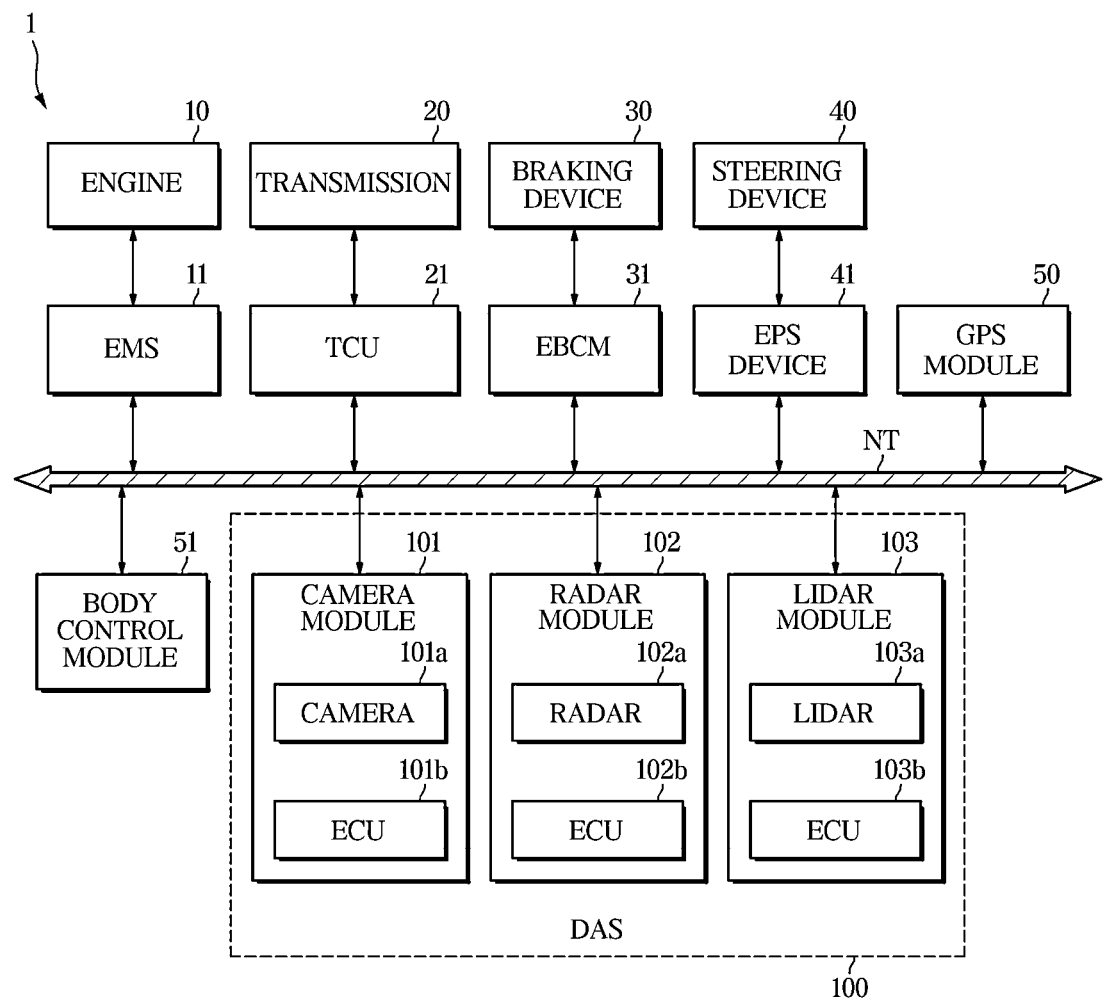
[FIG. 1]

[FIG. 2]
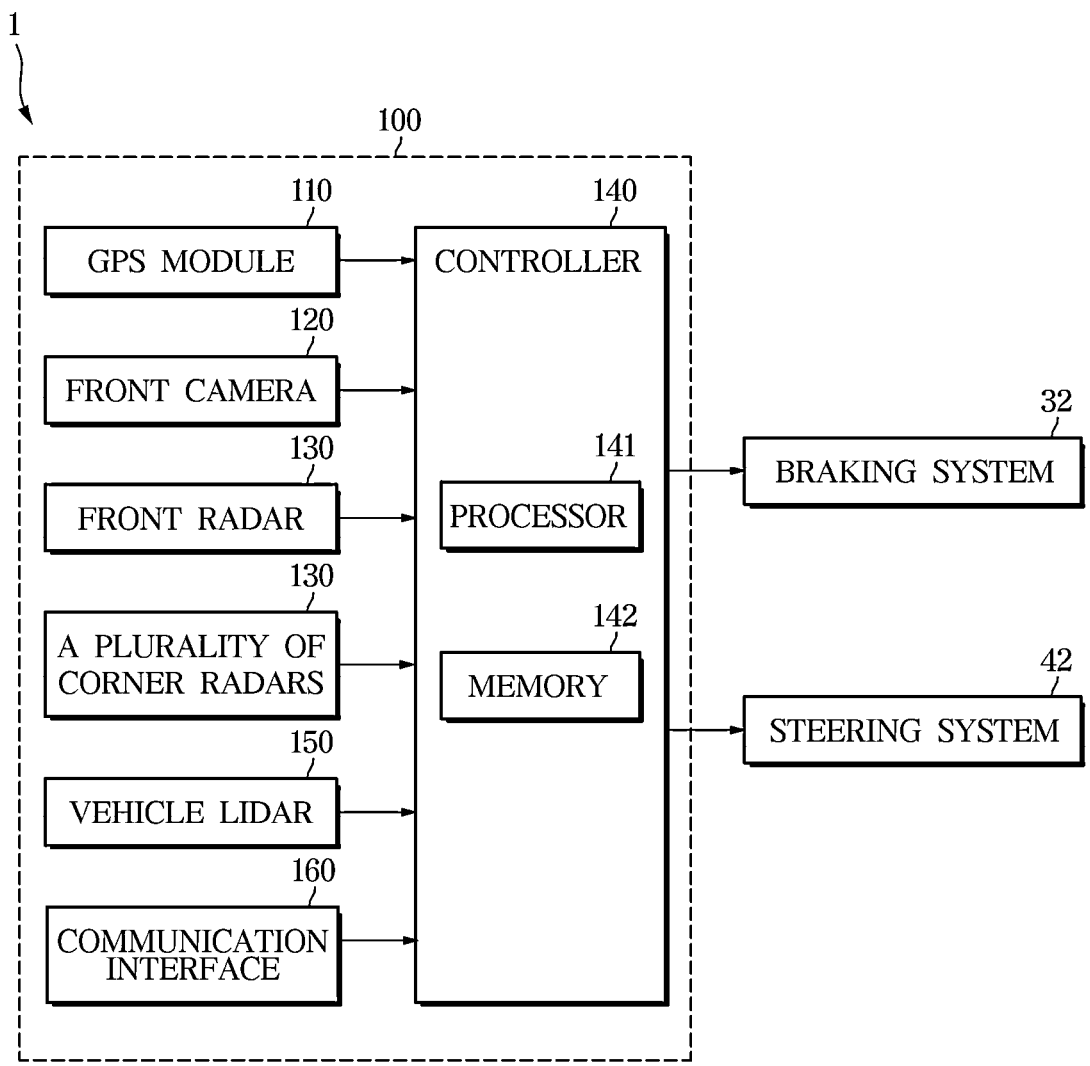

[FIG. 3]
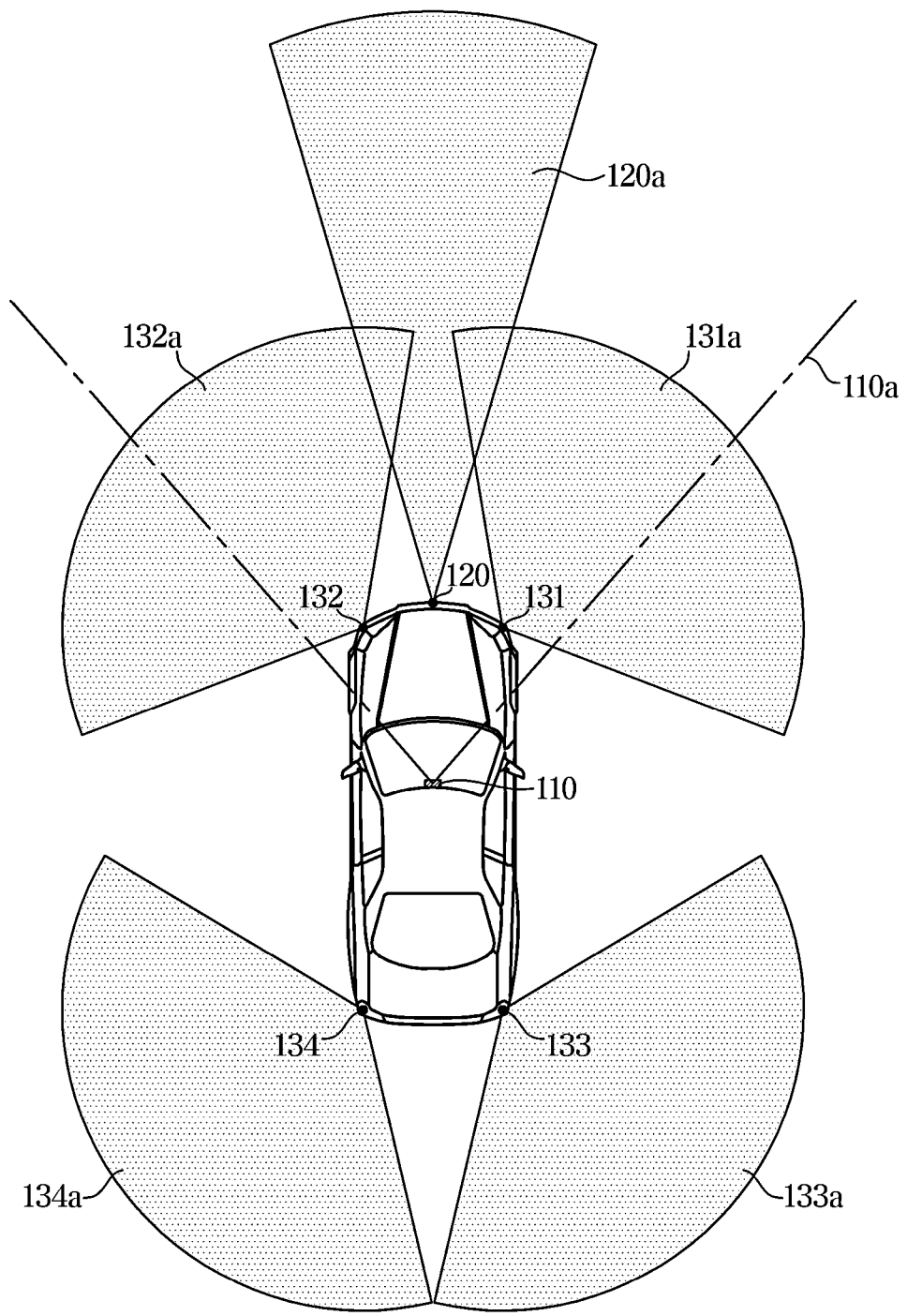

[FIG. 4]
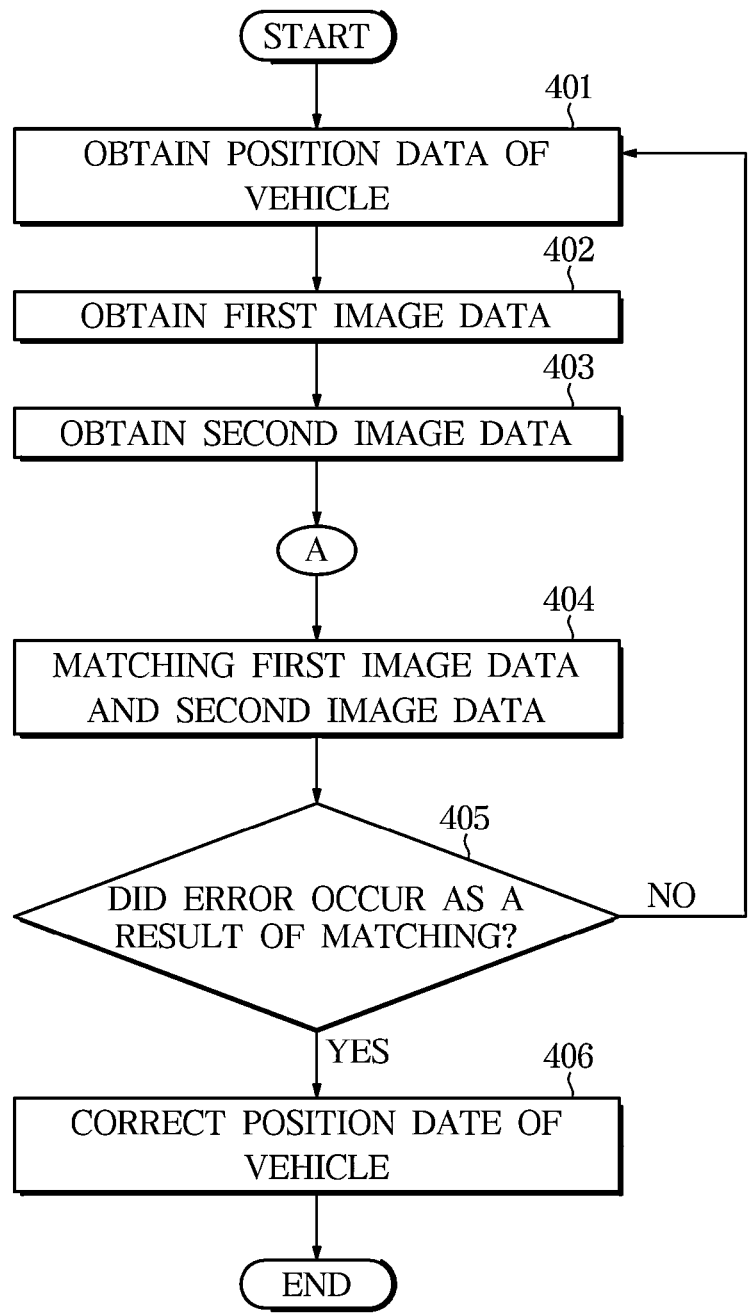

[FIG. 5]
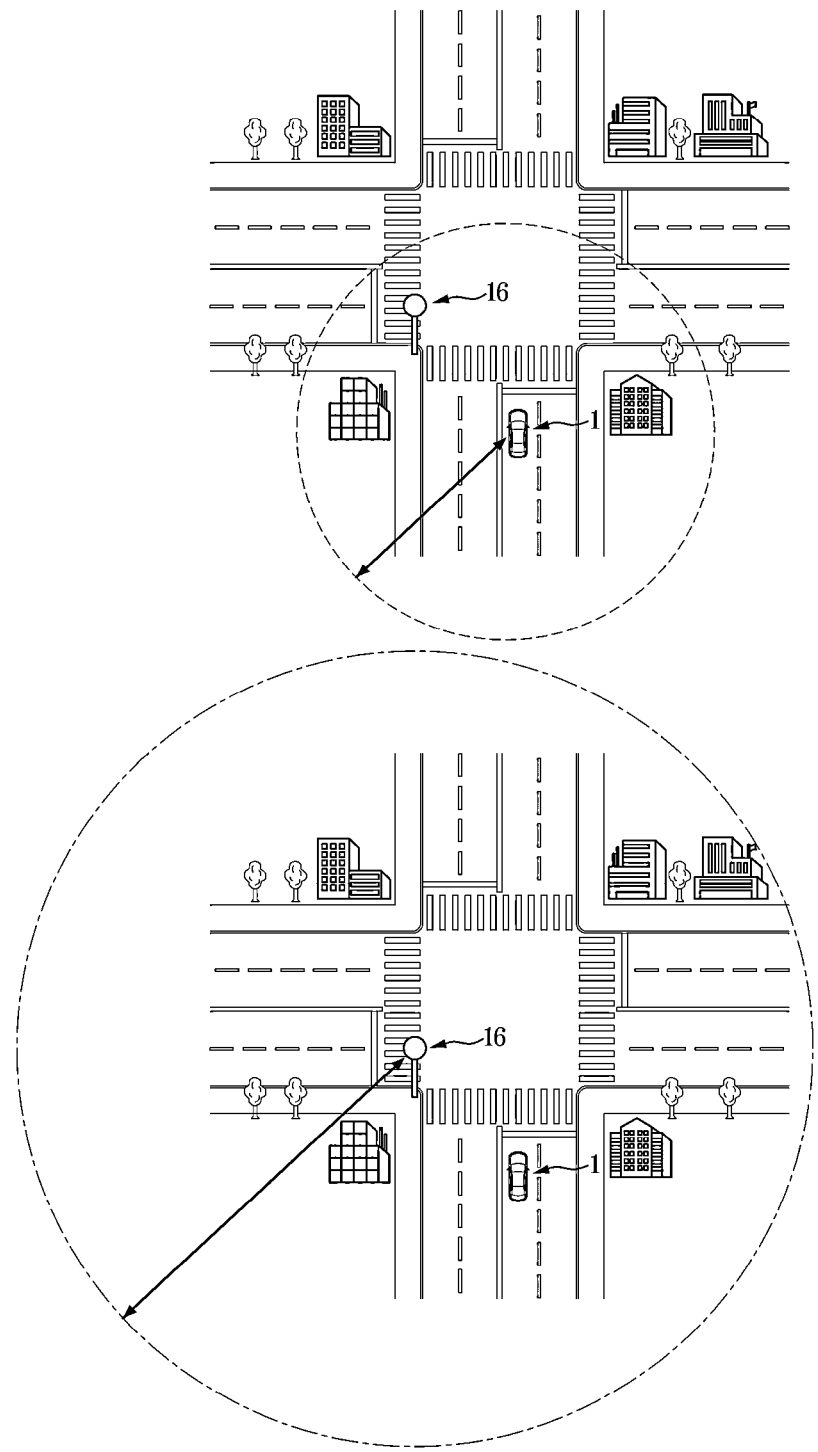

[FIG. 6]
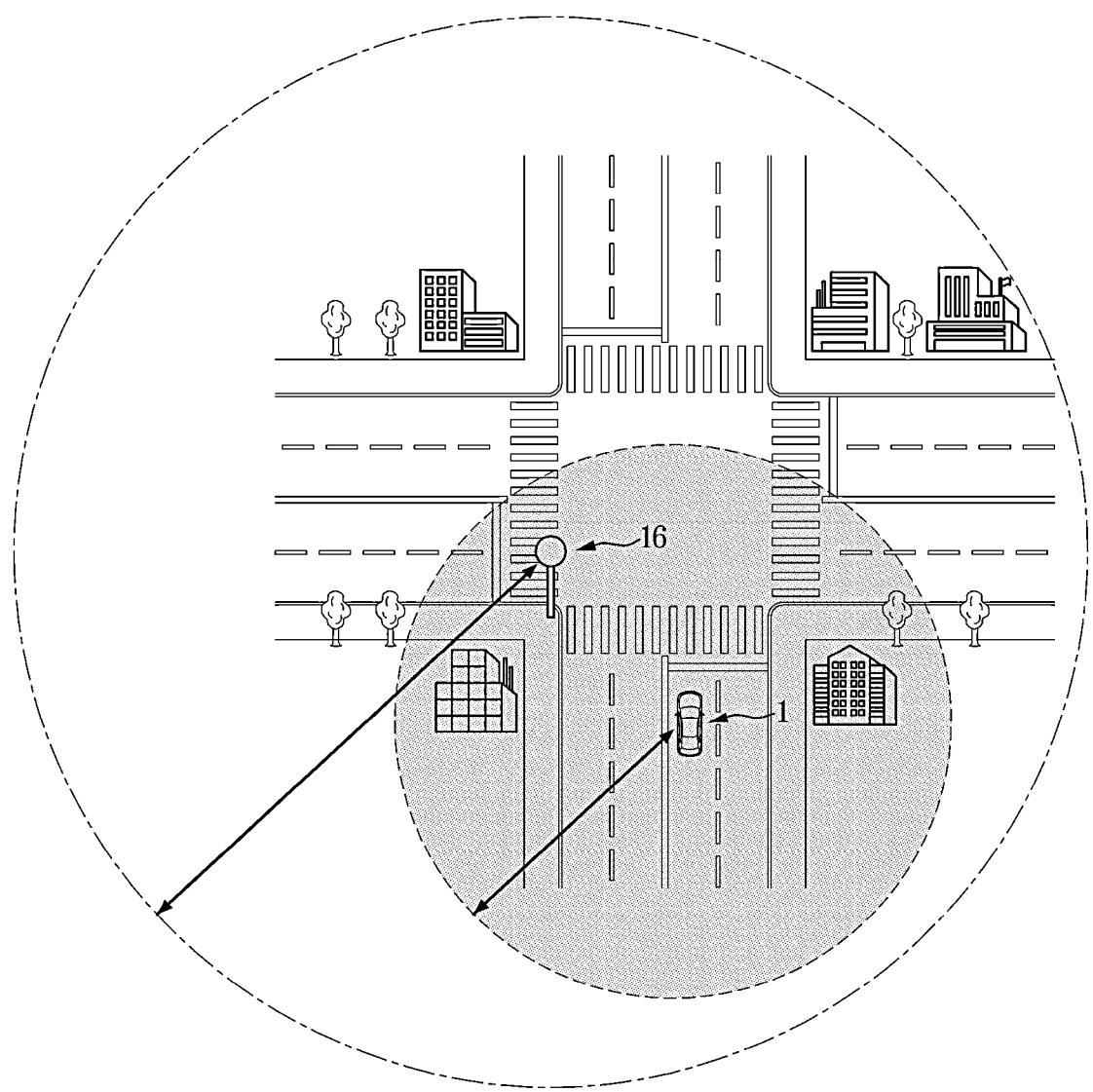

[FIG. 7]
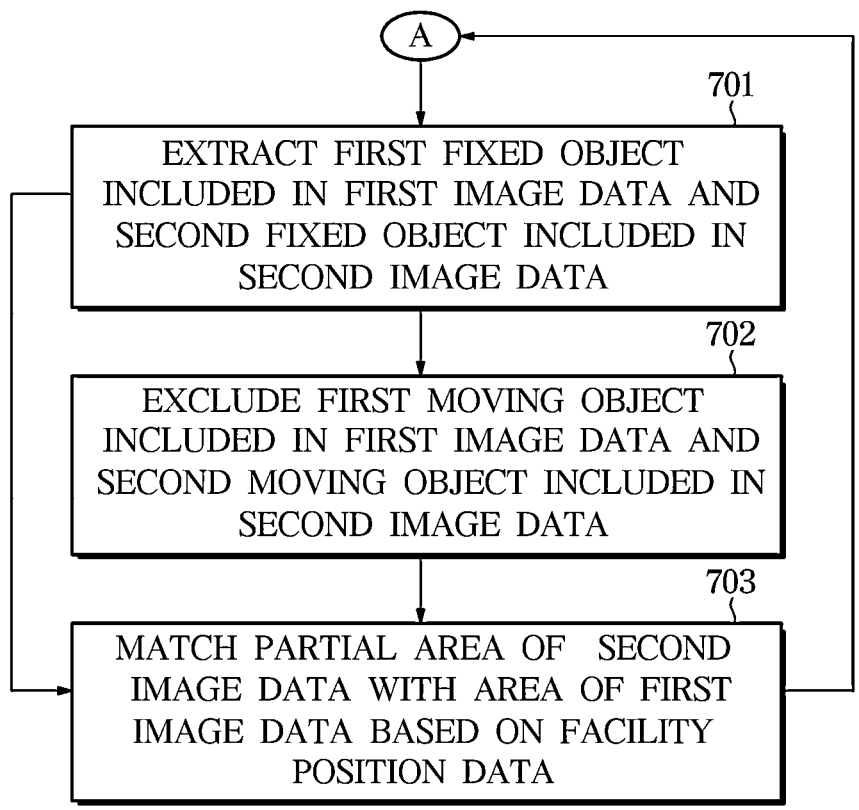

[FIG. 8]
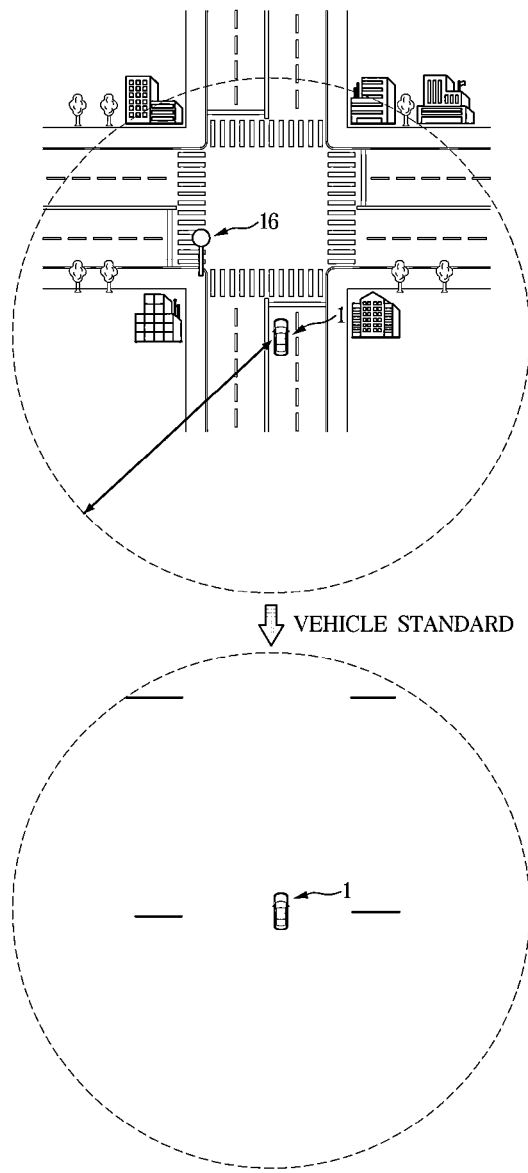

[FIG. 9]
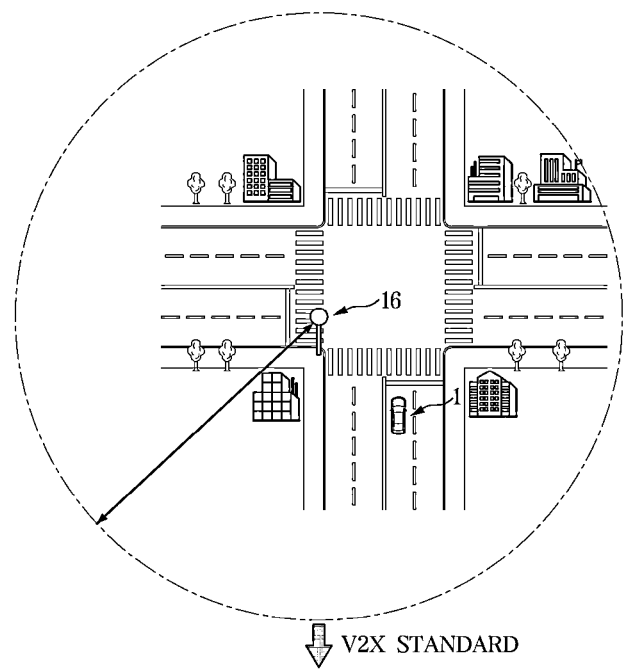
V2X STANDARD
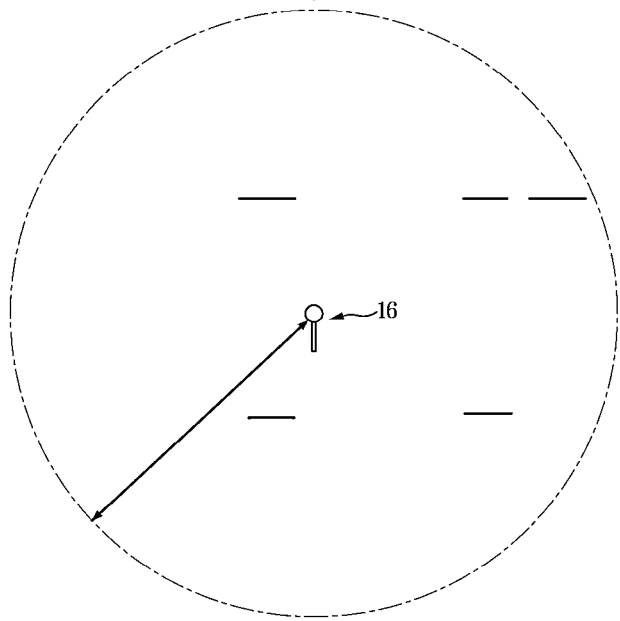

[FIG. 10]
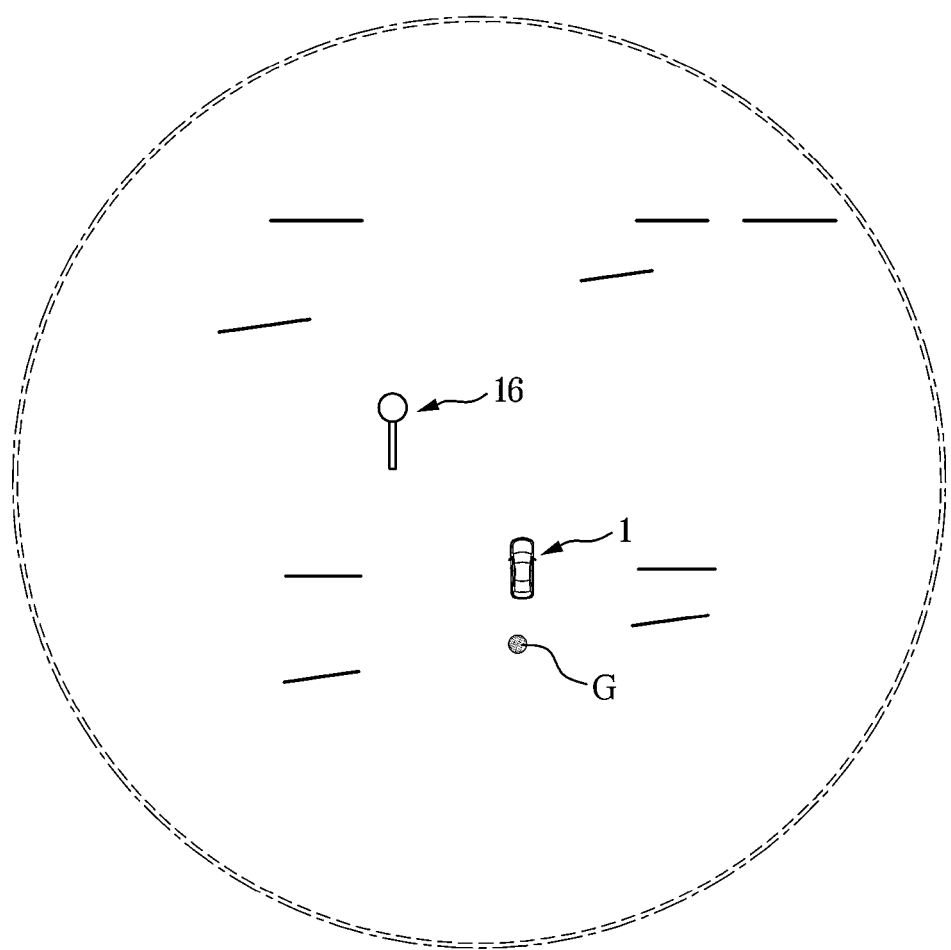

DRIVER ASSISTANCE APPARATUS AND METHOD OF CONTROLLING THE SAME

CROSS-REFERENCE TO RELATED APPLICATION(S)

This application is based on and claims priority under 35 U.S.C. § 119 to Korean Patent Application No. 10-2020-0027186, filed on Mar. 4, 2020, the disclosure of which is incorporated herein by reference.

BACKGROUND

1. Field

The disclosure relate to a driver assistance apparatus, and more particularly, to the driver assistance apparatus capable of obtaining a positioning of a vehicle.

2. Description of Related Art

An autonomous driving system enables a vehicle to be driven without a driver's operation based on information about external lanes of the vehicle and information about objects outside the vehicle.

In order to implement a complete autonomous driving system, it is essential to grasp an exact positioning of the vehicle.

On the other hand, there is a method of determining a positioning of the vehicle using global positioning system (GPS) information, but it is a reality that positioning accuracy is low due to other purposes, and this method has a limitation.

SUMMARY

An aspect of the disclosure is to provide a driver assistance apparatus that obtains accurate positioning using a Light Detection And Ranging (LiDAR) of a vehicle and external infrastructure (V2X), and a method of controlling the driver assistance apparatus.

Additional aspects of the disclosure will be set forth in part in the description which follows and, in part, will be obvious from the description, or may be learned by practice of the disclosure.

In accordance with an aspect of the disclosure, a driver assistance apparatus includes a global positioning system (GPS) module configured to obtain position data of a vehicle; a Light Detection And Ranging (LiDAR) installed in the vehicle to have an external field of view of the vehicle, and configured to obtain first image data for the external field of view of the vehicle; a communication interface configured to receive second image data obtained by an external LiDAR disposed at a position different from the vehicle; and a controller including at least one processor configured to process the first image data and the second image data. The controller may be configured to compare the first image data and the second image data, and to correct the position data when an error occurs as a result of the comparison.

The communication interface may be configured to receive the second image data obtained by the external LiDAR installed in an external facility. The external facility may include at least one of a traffic light, a sign, and a street light.

The controller may be configured to obtain facility position data of the external facility, and to match a partial area of the second image data with an area of the first image data based on the facility position data.

The controller may be configured to compare the area of the first image data and the partial area of the second image data, and to correct the position data when an error occurs as a result of the comparison.

The controller may be configured to extract at least one first fixed object included in the first image data, and to extract at least one second fixed object included in the second image data.

The controller may be configured to compare the area of the first image data and the partial area of the second image data, and to correct the position data when an error of more than a predetermined value occurs between the first fixed object and the second fixed object.

The controller may be configured to determine whether the at least one first fixed object and the at least one second fixed object are the same facility.

The first fixed object and the second fixed object are fixed buildings other than the external facility.

The controller may be configured to exclude at least one first moving object included in the first image data, and to exclude at least one second moving object included in the second image data.

The first moving object and the second moving object are other vehicles in motion other than the vehicle.

In accordance with another aspect of the disclosure, a method of controlling a driver assistance apparatus includes obtaining, by a global positioning system (GPS) module, position data of a vehicle; obtaining first image data for the external field of view of the vehicle by a Light Detection And Ranging (LiDAR) installed in the vehicle to have an external field of view of the vehicle; receiving, by a communication interface, second image data obtained by an external LiDAR disposed at a position different from the vehicle; and comparing, by a controller, the first image data and the second image data, and correcting the position data when an error occurs as a result of the comparison.

The receiving of the second image data may include receiving the second image data obtained by the external LiDAR installed in an external facility; and wherein the external facility comprises at least one of a traffic light, a sign, and a street light.

The correcting of the position data may include obtaining facility position data of the external facility; and matching a partial area of the second image data with an area of the first image data based on the facility position data.

The correcting of the position data may include comparing the area of the first image data and the partial area of the second image data; and correcting the position data when an error occurs as a result of the comparison.

The correcting of the position data may include extracting at least one first fixed object included in the first image data; and extracting at least one second fixed object included in the second image data.

The correcting of the position data may include comparing the area of the first image data and the partial area of the second image data; and correcting the position data when an error of more than a predetermined value occurs between the first fixed object and the second fixed object.

The correcting of the position data may include determining whether the at least one first fixed object and the at least one second fixed object are the same facility.

The first fixed object and the second fixed object are fixed buildings other than the external facility.

The correcting of the position data may include excluding at least one first moving object included in the first image data; and excluding at least one second moving object included in the second image data.

In accordance with another aspect of the disclosure, a non-transitory computer readable medium containing program instructions executed by a processor, the computer readable medium includes program instructions that obtain, by a global positioning system (GPS) module, position data of a vehicle; program instructions that obtain first image data for the external field of view of the vehicle by a Light Detection And Ranging (LiDAR) installed in the vehicle to have an external field of view of the vehicle; program instructions that receive, by a communication interface, second image data obtained by an external LiDAR disposed at a position different from the vehicle; and program instructions that compare, by a controller, the first image data and the second image data, and correcting the position data when an error occurs as a result of the comparison.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a block diagram illustrating components of a vehicle according to an embodiment.

FIG. 2 is a block diagram illustrating a driver assistance system (DAS) according to an embodiment.

FIG. 3 is a view illustrating a camera and a radar included in a DAS according to an embodiment.

FIG. 4 is a flowchart illustrating a method of controlling a vehicle according to an embodiment.

FIG. 5 is a view illustrating an example of first image data and second image data.

FIG. 6 is a view illustrating an example of matching between first image data and second image data.

FIG. 7 is a flowchart referred to in the control method of FIG. 4.

FIG. 8 is a view illustrating a process of processing first image data.

FIG. 9 is a view illustrating a process of processing second image data.

FIG. 10 is a view illustrating an example of correcting position data of a vehicle.

DETAILED DESCRIPTION

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Throughout the specification, when a member is located "on" another member, this includes not only when one member is in contact with another member but also when another member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, operation principles and embodiments of the disclosure will be described with reference to accompanying drawings.

FIG. 1 is a block diagram illustrating components of a vehicle according to an embodiment.

As illustrated in FIG. 1, a vehicle 1 may include an engine 10, a transmission 20, a braking device 30, and a steering device 40. The engine 10 may include at least one cylinder and at least one piston, and may generate power needed to drive the vehicle 1. The transmission 20 may include a plurality of gears, and may transmit power generated by the engine 10 to wheels of the vehicle 1. The braking device 30 may decelerate or stop the vehicle 1 through frictional force on wheels. The braking device 30 may include one or more brake pads and brake shoes operative to decelerate or stop the vehicle. The steering device 40 may change a driving direction of the vehicle 1.

The vehicle 1 may include a plurality of electronic constituent elements. For example, the vehicle 1 may further include an Engine Management System (EMS) 11, a Transmission Controller also referred to as a Transmission Control Unit (TCU) 21, an Electronic Brake Controller also referred to as an Electronic Brake Control Module (EBCM) 31, an Electronic Power Steering (EPS) device 41, a Body Control Module (BCM), and a driver assistance system (DAS) 100.

The EMS 11 may control the engine 10 in response to either the driver's acceleration intention from the acceleration pedal or a request signal from the DAS 100. For example, the EMS 11 may control torque of the engine 10.

The TCU 21 may control the transmission 20 in response to either a driver's gearshift command activated by a gearshift lever and/or a driving speed of the vehicle 1. For example, the TCU 21 may adjust or regulate a gearshift ratio from the engine 10 to wheels of the vehicle 1.

The EBCM 31 may control a braking device 30 in response to either the driver's brake intention from a brake pedal or slippage of wheels. For example, the EBCM 31 may temporarily release wheel braking in response to wheel slippage detected in a braking mode of the vehicle 1, resulting in implementation of an Anti-lock Braking System (ABS). The EBCM 31 may selectively release braking of wheels in response to oversteering and/or understeering detected in a steering mode of the vehicle 1, resulting in implantation of Electronic Stability Control (ESC). In addition, the EBCM 31 may temporarily brake wheels in response to wheel slippage detected by vehicle driving, resulting in implementation of a Traction Control System (TCS).

The EPS device 41 may assist the steering device 40 in response to the driver's steering intention from the steering wheel, such that the EPS device 41 may assist the driver in easily handling the steering wheel. For example, the EPS device 41 may assist the steering wheel 40 in a manner that steering force decreases in a low-speed driving mode or a parking mode of the vehicle 1 but increases in a high-speed driving mode of the vehicle 1.

A GPS module 50 may receive a satellite signal including navigation data from at least one Global Position System (GPS) satellite. The vehicle 1 may obtain a current position of the vehicle 1 and a driving direction of the vehicle 1 based on the satellite signal.

A body control module 51 may control various electronic components that are capable of providing the driver with user convenience or guaranteeing driver safety. For example, the body control module 51 may control headlamps (headlights), wipers, an instrument or other cluster, a multifunctional switch, turn signal indicators, or the like.

The DAS 100 may assist the driver in easily handling (e.g., driving, braking, and steering) the vehicle 1. For example, the DAS 100 may detect peripheral environments (e.g., a peripheral vehicle, pedestrian, cyclist, lane, traffic sign, or the like) of the vehicle 1 (i.e., vehicle itself), and may perform driving, braking, and/or steering of the vehicle 1 in response to the detected peripheral environments.

The DAS 100 may provide the driver with various functions. For example, the DAS 100 may provide the driver with a Lane Departure Warning (LDW) function, a Lane Keeping Assist (LKA) function, a High Beam Assist (HBA) function, an Autonomous Emergency Braking (AEB) function, a Traffic Sign Recognition (TSR) function, a Smart Cruise Control (SCC) function, a Blind Spot Detection (BSD) function, or the like.

The DAS 100 may include a camera module 101 operative to obtain image data of a peripheral area of the vehicle 1 (e.g., an area outside of and surrounding the vehicle 1), and a radar module 102 operative to obtain data about a peripheral object present in the peripheral area of the vehicle 1. The camera module 101 may include a camera 101*a* or multiple cameras and an Electronic Control Unit (ECU) 101*b*. The camera 101*a* may capture an image including a forward area of the vehicle 1 (e.g., an area in front of the vehicle 1), and may include an image processor operative to process the captured image to recognize peripheral vehicles, pedestrians, cyclists, lanes, traffic signs, or the like in the captured image. The radar module 102 may include a radar 102*a* or multiple radars and an ECU 102*b*, and may obtain or determine a relative position, a relative speed, or the like of the peripheral object (e.g., a peripheral vehicle, a pedestrian, or a cyclist) of the vehicle 1 based on detected radar data.

The DAS 100 may include a Light Detection And Ranging (LiDAR) module 103 that scans around the vehicle 1 and detects the object. The LiDAR module 103 includes a LiDAR 103*a* and an ECU 103*b*, and may obtain or determine the relative position, the relative speed, or the like of a moving object (e.g., the peripheral vehicle, the pedestrian, or the cyclist) around the vehicle 1 based on detected LiDAR data. In addition, the LiDAR module 103 may obtain a shape and position of a fixed object (e.g., a building, a sign, a traffic light, a bump, etc.) around the vehicle 1 based on detected LiDAR data.

The above-mentioned electronic components may communicate with each other through a vehicle communication network (NT). For example, the electronic components may perform data communication through Ethernet, Media Oriented Systems Transport (MOST), a FlexRay, a Controller Area Network (CAN), a Local Interconnect Network (LIN), or the like. For example, the DAS 100 may respectively transmit a drive control signal, a brake signal, and a steering signal to the EMS 11, the EBCM 31, and the EPS device 41 over the vehicle communication network (NT).

FIG. 2 is a block diagram illustrating a driver assistance system (DAS) according to an embodiment, and FIG. 3 is a view illustrating a camera and a radar included in a DAS according to an embodiment.

Referring to FIG. 2, the vehicle 1 may include a braking system 32, a steering system 42, and the DAS 100.

The braking system 32 according to the embodiment may include the EBCM 31 (see FIG. 1) and the braking device 30 (see FIG. 1) described in conjunction with FIG. 1, and the steering system 42 may include the EPS 41 (see FIG. 1) and the steering device 40 (see FIG. 1).

The DAS 100 may include a front camera 110 a front radar 120, and a plurality of corner radars 130.

The front camera 110 may have a field of view 110*a* directed to the front of the vehicle 1 as illustrated in FIG. 3. For example, the front camera 110 may be installed on a front windshield of the vehicle 1.

The front camera 110 may image the front of the vehicle 1 and acquire image data regarding the front of the vehicle 1. The image data regarding the front of the vehicle 1 may include a position of at least one of another vehicle, a pedestrian, a cyclist, a lane, or the like existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a controller 140. For example, the front camera 110 may be connected to the controller 140 through a vehicle communication network NT, through a hard wire, or through a printed circuit board (PCB).

The front camera 110 may transmit the image data of the front of the vehicle 1 to the controller 140.

The front radar 120 may have a field of sensing 120*a* directed to the front of the vehicle 1 as illustrated in FIG. 3. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an object. The front radar 120 may obtain front radar data from the transmission radio waves transmitted by the transmission antenna and the reflection radio waves received by the reception antenna. Front radar data may include distance information and speed information regarding the object, such as another vehicle, the pedestrian, or the cyclist existing in front of the vehicle 1. The front radar 120 may calculate the relative distance to the object based on the phase difference (or time difference) between the transmission radio waves and the reflection radio waves, and calculate the relative speed of the object based on the frequency difference between the transmission radio waves and the reflected radio waves.

The front radar 120 may be connected to the controller 140 through the vehicle communication network NT, the hard wire, or the PCB. The front radar 120 may transmit the front radar data to the controller 140.

The plurality of corner radars 130 may include a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1 as illustrated in FIG. 3. The first corner radar 131 may be installed on the right side of a front bumper of the vehicle 1. The second corner radar 132 may have a field of sensing 132a directed to the front left side of the vehicle 1, and may be installed on the left side of the front bumper of the vehicle 1. The third corner radar 133 may have a field of sensing 133a directed to the rear right side of the vehicle 1 and may be installed on the right side of a rear bumper of the vehicle 1. The fourth corner radar 134 may have a field of sensing 134a directed to the rear left side of the vehicle 1 and may be installed on the left side of the rear bumper of the vehicle 1.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance information and speed information regarding another vehicle, the pedestrian or the cyclist (hereinafter, referred to as the object) existing on the front right side of the vehicle 1.

The second corner radar data may include distance information and speed information regarding the object existing on the front left side of the vehicle 1.

The third and fourth corner radar data may respectively include distance and speed information regarding the object existing on the rear right side of the vehicle 1 and distance and speed information regarding the object located on the rear left side of the vehicle 1, respectively.

Each of the first, second, third, and fourth corner radars 131, 132, 133 and 134 may be connected to the controller 140, for example, through the vehicle communication network NT, the hard wire, or the PCB. The first, second, third, and fourth corner radars 131, 132, 133, and 134 may respectively transmit the first corner radar data, the second corner radar data, the third corner radar data, and the fourth corner radar data to the controller 140.

A vehicle LiDAR 150 may obtain the relative position, the relative speed, and the like of the moving object (e.g., another vehicle, the pedestrian, the cyclist, etc.) around the vehicle 1. In addition, the LiDAR module 103 may obtain the shape and position of the fixed object (e.g., the building, the sign, the traffic light, the bump, etc.) around the vehicle 1. The vehicle LiDAR 150 may be installed in the vehicle 1 so as to have an external field of view of the vehicle 1, and may include first image data for the external field of view of the vehicle 1. The first image data may be data including images of fixed objects and moving objects in a field of view outside the vehicle.

A communication interface 160 may obtain second image data obtained by an external LiDAR installed in an external facility. The external LiDAR may be installed in the external facility (e.g., the traffic light, the sign, a street light, the building, etc.) to provide the vehicle 1 with second image data obtained by the external LiDAR in a view of the external facility. The second image data may be information obtained from an external infrastructure other than the vehicle 1 and indicate V2X (Vehicle-to-everything) data.

The communication interface 160 may receive data transmitted from the outside through a communication network using a communication method such as 3G, 4G, and 5G. The communication interface 160 may be configured as a device supporting 3G, 4G, and 5G communication methods employed by the communication network.

The controller 140 may include the ECU 101b (see FIG. 1) of the camera module 101 (see FIG. 1) and/or the ECU 102b (see FIG. 1) of the radar module 102 (see FIG. 1), and/or an integrated ECU.

The controller 140 includes a processor 141 and a memory 142.

The processor 141 may process the front image data of the front camera 110, the front radar data of the front radar 120, and the corner radar data of the plurality of corner radars 130, and generate a braking signal and a steering signal for controlling the braking system 32 and the steering system 42. For example, the processor 141 may include an image signal processor for processing the front image data of the front camera 110 and/or a digital signal processor for processing radar data of the radars 120 and 130 and/or a micro control unit (MCU) for generating a braking signal and/or a steering signal.

The processor 141 may detect objects (e.g., another vehicle, the pedestrian, the cyclist, and the like) in front of the vehicle 1 based on the front image data of the front camera 110 and the front radar data of the radar 120.

In detail, the processor 141 may obtain the position (distance and direction) and the relative speed of the objects in front of the vehicle 1 based on the front radar data of the front radar 120. The processor 141 may obtain the position (direction) and type information (for example, whether the object is another vehicle, the pedestrian, the cyclist, or the like) of the object existing in front of the vehicle 1 based on the front image data of the front camera 110. In addition, the processor 141 may match the objects detected by the front image data with the objects detected by the front radar data, and obtain the position (distance and direction) and the relative speed of the objects in front of the vehicle 1 based on a result of the matching.

The processor 141 may generate the braking signal and a steering signal based on the type information, the position, and the relative speed of the front objects.

For example, the processor 141 calculates a time to collision (TTC) between the vehicle 1 and the front object based on the position (distance) and the relative speed of the front objects, and warns the driver of a collision, transmits the braking signal to the braking system 32, or transmits the steering signal to the steering system 42 based on a result of comparing the TTC with a predetermined reference time. In response to the TTC less than a predetermined first reference time, the processor 141 may allow an alert to be output via audio and/or display. In response to the TTC less than a predetermined second reference time, the processor 141 may transmit a preliminary-braking signal to the braking system 32. In response to the TTC less than a predetermined third reference time, the processor 141 may transmit an emergency braking signal to the braking system 32. In this case, the second reference time is shorter than the first reference time, and the third reference time is shorter than the second reference time.

As another example, the processor 141 may calculate a distance to collision (DTC) based on the relative speed of front objects, and warn the driver of a collision or transmit the braking signal to the braking system 32 based on a result of comparing the DTC with distances to the front objects.

The processor 141 may obtain the position (distance and direction) and the relative speed of the objects on the sides of the vehicle 1 (front right, front left, rear right, and rear left) based on corner radar data of the plurality of corner radars 130.

The processor 141 may transmit the steering signal to the steering system 42 based on the position (distance and direction) and the relative speed of lateral objects of the vehicle 1.

For example, when the collision with the front object is determined based on TTC or DTC, the processor 141 may transmit the steering signal to the steering system 42 to avoid collision with the front object.

The processor 141 may determine whether to avoid the collision with the front object by changing the driving direction of the vehicle 1 based on the position (distance and direction) and relative speed of the lateral objects of the vehicle 1. For example, when there is no the object located on the side of the vehicle 1, the processor 141 may transmit the steering signal to the steering system 42 in order to avoid the collision with the front object. When the collision with the lateral object is not predicted after the steering of the vehicle 1 based on the position (distance and direction) of the lateral objects and the relative speed, the processor 141 may transmit the steering signal to the steering system 42 in order to avoid the collision with the front object. When the collision with the lateral object is predicted after the steering of the vehicle 1 based on the position (distance and direction) of the lateral objects and the relative speed, the processor 141 may not transmit the steering signal to the steering system 42.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

The DAS 100 is not limited to the components illustrated in FIG. 2, and may further include the LiDAR that scans around the vehicle 1 and detects the object.

As such, the controller 140 may transmit the braking signal to the braking system 32 based on whether the collision with the front object is predicted. When the lateral object does not exist or the collision with the lateral object is not predicted, the controller 140 may transmit the steering signal to the steering system 42 to avoid collision with the front object. When the collision with the lateral object is predicted after steering, the controller 140 may not transmit the steering signal to the steering system 42.

Hereinafter, an embodiment of a driver assistance apparatus and a method of controlling the driver assistance apparatus will be described in detail with reference to the accompanying drawings.

FIG. 4 is a flowchart illustrating a method of controlling a vehicle according to an embodiment. However, this is only a preferred embodiment for achieving the purpose of the disclosure, and of course, some operations may be added or deleted as necessary.

The controller 140 may obtain position data of the vehicle 1 (401). At this time, the position data corresponds to current position information of the vehicle 1 obtained by the GPS module 50 provided in the vehicle 1. In general, the position data obtained by the GPS module 50 corresponds to an actual position value. Accordingly, in this embodiment, position data is corrected based on the first image data and the second image data, and accurate position information of the current vehicle 1 may be obtained.

The controller 140 may obtain the first image data on the external field of view of the vehicle 1 through LiDAR provided in the vehicle 1 (402). The first image data may refer to an external image within a predetermined area based on the position of the vehicle 1.

Referring to FIG. 5, an area of the first image data, which is the external image within a certain radius with respect to the vehicle 1, may be identified, and an area of the second image data, which is an external image within a certain radius with respect to an external facility 16, may be identified.

In this case, the image data may be a map generated around the vehicle 1 or the external facility 16.

The controller 140 may obtain the second image data obtained by the external LiDAR installed in the external facility 16 in a different position from the vehicle 1 through the communication interface 160 provided in the vehicle 1 (403). The second image data may refer to an external image within a predetermined area based on a position of the external facility 16.

The external facility 16 may include at least one of the traffic light, the sign, and the street light.

In this case, the area of the first image data and the area of the second image data are different from each other. Particularly, a radius range may be different according to the setting of the LiDAR of the vehicle 1 and the external LiDAR of the external facility 16, and a reference of the image area according to a capturing position are different.

On the other hand, the first image data and the second image data require a certain processing process for accurate comparison before performing matching. This will be described in detail with reference to FIG. 7.

The controller 140 may perform matching between the first image data and the second image data (404), determine whether an error occurs as a result of the matching (405). When it is determined that the error exists, the controller 140 may correct the position date received from the GPS module 50 (406). Particularly, when the matching is performed between the first image data and the second image data, the controller 140 may compare the first image data and the second image data and determine whether there is a difference in coordinates between the fixed object or the moving object.

Referring to FIG. 6, the area of the first image data, which is the external image within the certain radius with respect to the vehicle 1, may be identified, and the area of the second image data, which is the external image within the certain radius with respect to the external facility 16, may be identified. In this case, a common area is matched and it is checked whether the error exists between a partial area of the first image data and a partial area of the second image data.

Particularly, the controller 140 may obtain facility position data of the external facility 16. At this time, as a result of performing image processing on the second image data, the controller 140 may determine the position information of the vehicle 1 without using GPS information. As a result of performing image processing on the first image data, the controller 140 may obtain the facility position data. The controller 140 may match the partial area of the second image data with the partial area of the first image data based on the facility position data.

The controller 140 may perform matching between the area of the first image data and the partial area of the second image data. When the error occurs as the result of the matching, the controller 140 may correct the position data obtained from the GPS module 50 of the vehicle 1. In addition, the controller 140 may perform matching between the partial area of the first image data and the area of the second image data. When the error occurs as the result of the matching, the controller 140 may correct the position data obtained from the GPS module 50 of the vehicle 1. In addition, the controller 140 may perform matching between the partial area of the first image data and the partial area of the second image data. When the error occurs as the result of the matching, the controller 140 may correct the position data obtained from the GPS module 50 of the vehicle 1.

FIG. 7 is a flowchart referred to in the control method of FIG. 4. However, this is only a preferred embodiment for achieving the purpose of the disclosure, and of course, some operations may be added or deleted as necessary.

The controller 140 may extract a first fixed object included in the first image data and a second fixed object included in the second image data (701). Here, the first fixed object may be a fixed building captured from a viewpoint of the vehicle 1. In addition, the second fixed object may be a fixed building captured from a viewpoint of the external facility 16. At this time, the controller 140 may determine whether the first fixed object and the second fixed object are the same facility for matching consistency. In this case, the first fixed object and the second fixed object may be based on one facility or may be based on a plurality of facilities. The fixed object is, for example, the building, but includes all facilities settled in the surrounding environment other than the vehicle 1 in addition to the building.

Referring to FIG. 8, a process of processing the first image data may be identified. The controller 140 may extract a plurality of first fixed objects based on four buildings from a predetermined area of the first image data based on the vehicle 1.

Referring to FIG. 9, a process of processing the second image data may be identified. The controller 140 may extract a plurality of second fixed objects based on four buildings from a predetermined area of the second image data based on the external facility 16.

In addition, the controller 140 may exclude the first moving object included in the first image data and the second moving object included in the second image data (702). In the previous operation, the fixed objects were extracted to perform matching based on fixed and identical facilities. Here, the controller 140 may exclude moving objects other than the vehicle 1, which cannot be a reference for matching, in order to reduce an amount of operation of image processing for performing matching. The moving object may include all moving objects other than buildings such as vehicles, bicycles, and motorcycles other than the vehicle 1.

The controller 140 may match the partial area of the second image data with the area of the first image data based on the facility position data (703).

Particularly, the matching may be performed between the area of the first image data and the partial area of the second image data. When an error of more than a predetermined value between the first and second fixed objects occurs, the controller 140 may correct the position data received from the GPS module 50.

FIG. 10 is a view illustrating an example of correcting position data of a vehicle.

Referring to FIG. 10, the matching between the first image data and the second image data has been completed, and it may be seen that there is a difference between the plurality of first fixed objects and the plurality of second fixed objects described above. In this case, the controller 140 may obtain the accurate position information of the vehicle 1 by reflecting a difference value existing as the result of matching to the position data received from the GPS module 50.

According to the embodiments of the disclosure, it is possible to obtain the accurate positioning information of the vehicle. Thus, a precise autonomous driving system can be implemented.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. An apparatus for assisting driving of a host vehicle, comprising:
a global positioning system (GPS) module configured to obtain position data of a vehicle;
a Light Detection And Ranging (LiDAR) installed in the host vehicle to have an external field of view of the host vehicle, and configured to obtain first image data for the external field of view of the host vehicle;
a communication interface configured to receive second image data obtained by an external LiDAR disposed at a position different from the host vehicle; and
a controller including at least one processor configured to process the first image data and the second image data, wherein the controller is configured to compare the first image data and the second image data, and to correct the position data when an error occurs as a result of the comparison.

2. The apparatus according to claim 1, wherein;
the communication interface is configured to receive the second image data obtained by the external LiDAR installed in an external facility; and
the external facility comprises at least one of a traffic light, a sign, and a street light.

3. The apparatus according to claim 2, wherein the controller is configured to obtain facility position data of the external facility, and to match a partial area of the second image data with an area of the first image data based on the facility position data.

4. The apparatus according to claim 3, wherein the controller is configured to compare the area of the first image data and the partial area of the second image data, and to correct the position data when an error occurs as a result of the comparison.

5. The apparatus according to claim 2, wherein the controller is configured to extract at least one first fixed object included in the first image data, and to extract at least one second fixed object included in the second image data.

6. The apparatus according to claim 5, wherein the controller is configured to compare the area of the first image data and the partial area of the second image data, and to correct the position data when an error of more than a predetermined value occurs between the first fixed object and the second fixed object.

7. The apparatus according to claim 5, wherein the controller is configured to determine whether the at least one first fixed object and the at least one second fixed object are the same facility.

8. The apparatus according to claim 5, wherein the first fixed object and the second fixed object are fixed buildings other than the external facility.

9. The apparatus according to claim 1, wherein the controller is configured to exclude at least one first moving object included in the first image data, and to exclude at least one second moving object included in the second image data.

10. The apparatus according to claim 9, wherein the first moving object and the second moving object are other vehicles in motion other than the host vehicle.

11. A method for assisting driving of a host vehicle, the method comprising:
obtaining, by a global positioning system (GPS) module, position data of the host vehicle;
obtaining first image data for the external field of view of the host vehicle by a Light Detection And Ranging (LiDAR) installed in the host vehicle to have an external field of view of the host vehicle;
receiving, by a communication interface, second image data obtained by an external LiDAR disposed at a position different from the host vehicle; and
comparing, by a controller, the first image data and the second image data, and correcting the position data when an error occurs as a result of the comparison.

12. The method according to claim 11, wherein the receiving of the second image data comprises:
receiving the second image data obtained by the external LiDAR installed in an external facility; and
wherein the external facility comprises at least one of a traffic light, a sign, and a street light.

13. The method according to claim 12, wherein the correcting of the position data comprises:
obtaining facility position data of the external facility; and
matching a partial area of the second image data with an area of the first image data based on the facility position data.

14. The method according to claim 13, wherein the correcting of the position data comprises:
comparing the area of the first image data and the partial area of the second image data; and
correcting the position data when an error occurs as a result of the comparison.

15. The method according to claim 12, wherein the correcting of the position data comprises:
extracting at least one first fixed object included in the first image data; and
extracting at least one second fixed object included in the second image data.

16. The method according to claim 15, wherein the correcting of the position data comprises:
comparing the area of the first image data and the partial area of the second image data; and
correcting the position data when an error of more than a predetermined value occurs between the first fixed object and the second fixed object.

17. The method according to claim 15, wherein the correcting of the position data comprises:
determining whether the at least one first fixed object and the at least one second fixed object are the same facility.

18. The method according to claim 15, wherein the first fixed object and the second fixed object are fixed buildings other than the external facility.

19. The method according to claim 11, wherein the correcting of the position data comprises:
excluding at least one first moving object included in the first image data; and
excluding at least one second moving object included in the second image data.

20. A non-transitory computer readable-medium storing computer-executable instructions when executed by a processor, the computer readable-medium comprising:
program instructions that obtain, by a global positioning system (GPS) module, position data of a host vehicle;
program instructions that obtain first image data for the external field of view of the host vehicle by a Light Detection And Ranging (LiDAR) installed in the host vehicle to have an external field of view of the host vehicle;
program instructions that receive, by a communication interface, second image data obtained by an external LiDAR disposed at a position different from the host vehicle; and
program instructions that compare, by a controller, the first image data and the second image data, and correcting the position data when an error occurs as a result of the comparison.

* * * * *